(12) United States Patent
Sasaki et al.

(10) Patent No.: US 10,686,961 B2
(45) Date of Patent: Jun. 16, 2020

(54) INFORMATION PROCESSING SYSTEM, CLIENT APPARATUS, AND NON-TRANSITORY COMPUTER READABLE RECORDING MEDIUM THAT RECORDS AN INFORMATION PROCESSING PROGRAM

(71) Applicant: KYOCERA DOCUMENT SOLUTIONS INC., Osaka (JP)

(72) Inventors: Hideyuki Sasaki, Osaka (JP); Yumi Nakagoshi, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 16/571,147

(22) Filed: Sep. 15, 2019

(65) Prior Publication Data

US 2020/0099817 A1 Mar. 26, 2020

(30) Foreign Application Priority Data

Sep. 21, 2018 (JP) .................................. 2018-176763

(51) Int. Cl.
*H04N 1/32* (2006.01)
*H04L 29/06* (2006.01)

(52) U.S. Cl.
CPC ....... *H04N 1/32117* (2013.01); *H04L 63/029* (2013.01); *H04N 1/32096* (2013.01)

(58) Field of Classification Search
CPC ............ H04N 1/32117; H04N 1/32096; H04L 63/029

USPC ......................................................... 358/1.15
See application file for complete search history.

(56) References Cited

U.S. PATENT DOCUMENTS

| 2011/0090529 | A1* | 4/2011 | Hertling ................. G06F 3/1204 358/1.15 |
| 2012/0044524 | A1* | 2/2012 | Kong .................. G03G 15/5079 358/1.15 |
| 2013/0063773 | A1* | 3/2013 | Bae ....................... G06Q 10/107 358/1.15 |
| 2015/0046556 | A1* | 2/2015 | Takenouchi .......... H04L 67/025 709/207 |
| 2016/0308829 | A1* | 10/2016 | Song .................... H04L 63/0209 |

FOREIGN PATENT DOCUMENTS

JP        2014134973 A        7/2014

* cited by examiner

*Primary Examiner* — Allen H Nguyen
(74) *Attorney, Agent, or Firm* — Li & Cai Intellectual Property (USA) Office (57) ABSTRACT

An information processing system includes: an SNS server apparatus configured to be connected to a network and store one or more messages submitted to an SNS from a terminal apparatus; and a client apparatus configured to be connected to the network via a firewall and capable of communicating with the SNS server apparatus, the client apparatus being configured to receive, from the SNS server apparatus, one or more messages submitted to a channel, to which the client apparatus logs in, of the SNS, extract, from the one or more messages, a message including a control command to the client apparatus, and execute processing in accordance with the control command.

8 Claims, 7 Drawing Sheets

INFORMATION PROCESSING SYSTEM, CLIENT APPARATUS, AND NON-TRANSITORY COMPUTER READABLE RECORDING MEDIUM THAT RECORDS AN INFORMATION PROCESSING PROGRAM

CROSS-REFERENCE TO RELATED PATENT APPLICATION

This application claims the benefit of Japanese Priority Patent Application JP 2018-176763 filed Sep. 21 2018, the entire contents of which are incorporated herein by reference.

FIELD OF THE DISCLOSURE

The present disclosure relates to an information processing system including an SNS server apparatus and a client apparatus capable of communicating with each other. The present disclosure further relates to the client apparatus. The present disclosure further relates to a non-transitory computer readable recording medium that records an information processing program executable by the client apparatus.

BACKGROUND OF THE DISCLOSURE

There is known an information processing system, with which users submit and browse information and thereby share the information.

SUMMARY OF THE DISCLOSURE

It is desirable to provide a further user friendly technology that uses such an information processing system.

According to an embodiment of the present disclosure, there is provided an information processing system, including:

an SNS server apparatus configured to be connected to a network and store one or more messages submitted to an SNS from a terminal apparatus; and a client apparatus configured to be connected to the network via a firewall and capable of communicating with the SNS server apparatus, the client apparatus being configured to receive, from the SNS server apparatus, one or more messages submitted to a channel, to which the client apparatus logs in, of the SNS, extract, from the one or more messages, a message including a control command to the client apparatus, and execute processing in accordance with the control command.

According to an embodiment of the present disclosure, there is provided a client apparatus configured to be connected to a network via a firewall and capable of communicating with an SNS server apparatus, the SNS server apparatus being configured to be connected to the network and store one or more messages submitted to an SNS from a terminal apparatus, the client apparatus including:

a controller circuit configured to receive, from the SNS server apparatus, one or more messages submitted to a channel, to which the client apparatus logs in, of the SNS, extract, from the one or more messages, a message including a control command to the client apparatus, and execute processing in accordance with the control command.

According to an embodiment of the present disclosure, there is provided a non-transitory computer readable recording medium that records an information processing program that causes a controller circuit of a client apparatus configured to be connected to a network via a firewall and capable of communicating with an SNS server apparatus, the SNS server apparatus being configured to be connected to the network and store one or more messages submitted to an SNS from a terminal apparatus, to receive, from the SNS server apparatus, one or more messages submitted to a channel, to which the client apparatus logs in, of the SNS, extract, from the one or more messages, a message including a control command to the client apparatus, and execute processing in accordance with the control command.

These and other objects, features and advantages of the present disclosure will become more apparent in light of the following detailed description of best mode embodiments thereof, as illustrated in the accompanying drawings.

DETAILED DESCRIPTION OF THE EXEMPLARY EMBODIMENTS

Hereinafter, an embodiment of the present disclosure will be described with reference to the drawings.

1. OUTLINE OF INFORMATION PROCESSING SYSTEM

Figure 1:
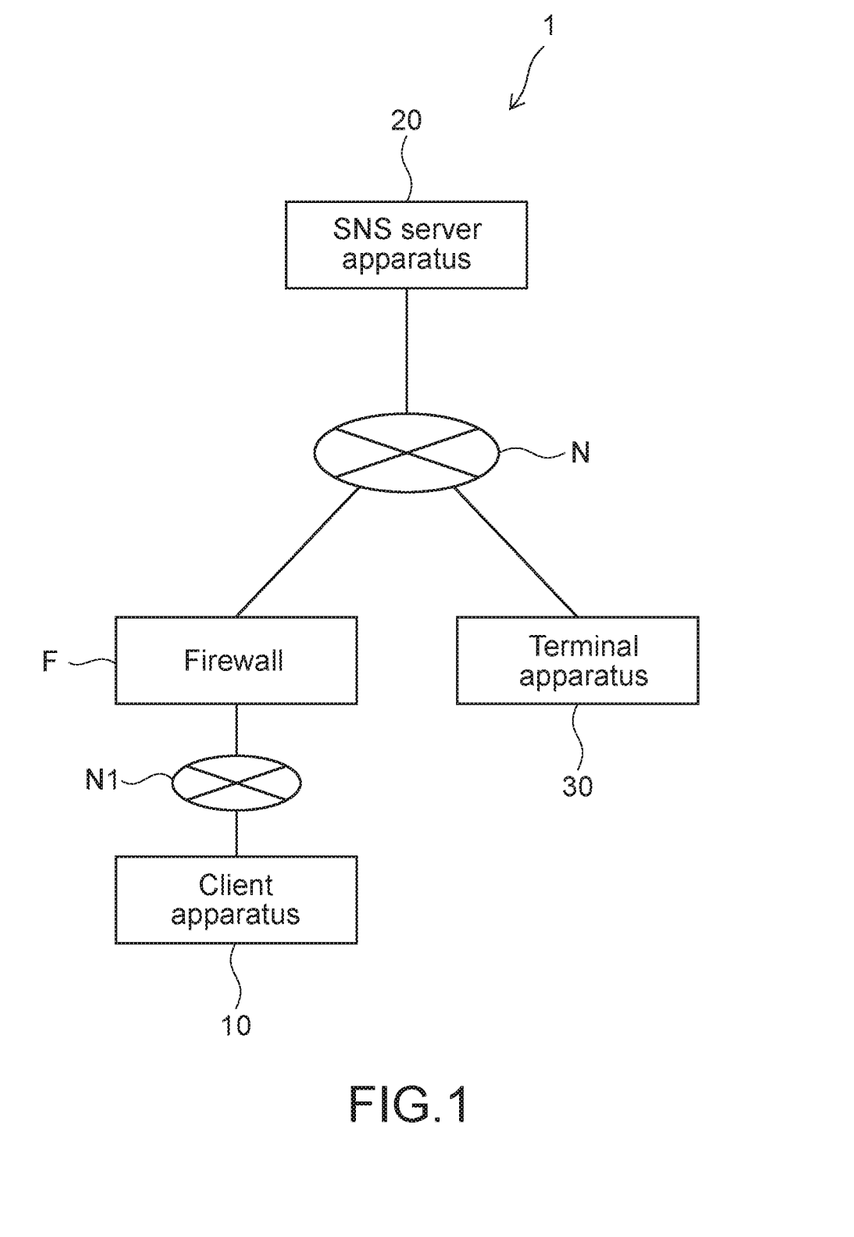
FIG. 1 schematically shows an information processing system according to an embodiment of the present disclosure.

FIG. 1 schematically shows an information processing system according to an embodiment of the present disclosure.

The information processing system 1 includes the client apparatus 10, the SNS server apparatus 20, and the terminal apparatus 30. The client apparatus 10, the SNS server apparatus 20, and the terminal apparatus 30 are connected to each other via the network N including the Internet.

The SNS server apparatus 20 provides a chat system, which is an information processing system. The SNS server apparatus 20 uploads a message and a file (document file, image file, PDF file, etc.) submitted from a terminal apparatus (the terminal apparatus 30 or another terminal apparatus) via the network N to a channel of an SNS realized in the chat system.

The terminal apparatus 30 is, for example, a smartphone, a tablet computer, a personal computer, a wearable computer, or the like. Typically, the terminal apparatus 30 is used by a worker (hereinafter simply referred to as user) at an office in which the client apparatus 10 is provided. The terminal apparatus 30 submits a message and a file to a channel of an SNS realized in the chat system via the network N. The terminal apparatus 30 receives the message and the file submitted to the channel of the SNS from another terminal apparatus via the network N, and shows the message and the file to a user.

The client apparatus 10 is connected to the intranet N1 (typically, LAN in office in which the client apparatus 10 is provided). The intranet N1 is connected to the network N via the firewall F. The client apparatus 10 is capable of communicating with the SNS server apparatus 20 via the intranet N1, the firewall F, and the network N. The client apparatus 10 is, for example, an image forming apparatus (Multifunction Peripheral, MFP).

2. HARDWARE CONFIGURATION OF CLIENT APPARATUS

Figure 2:
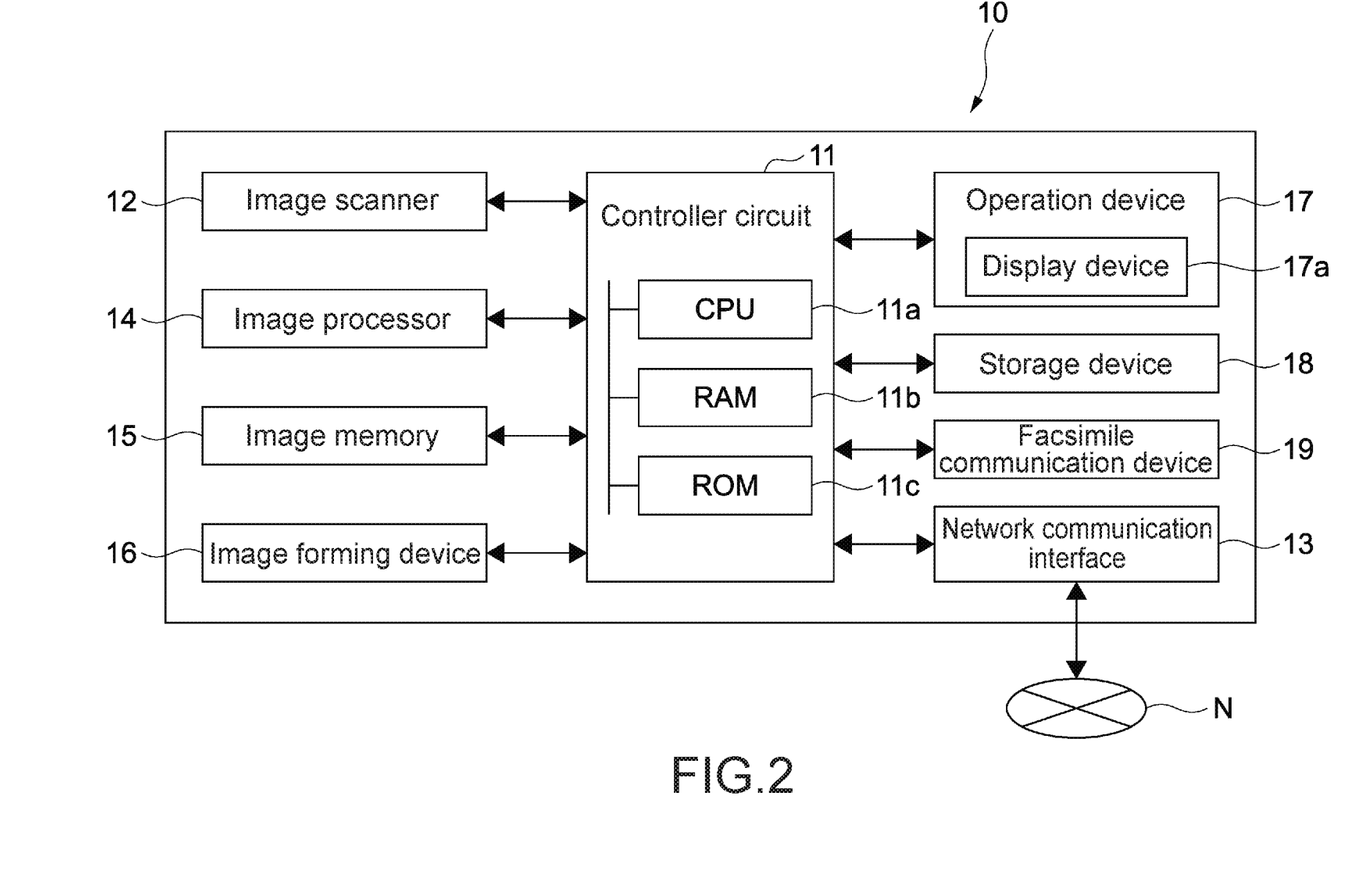
FIG. 2 shows a hardware configuration of a client apparatus.

FIG. 2 shows a hardware configuration of a client apparatus.

The client apparatus 10 includes the controller circuit 11. The controller circuit 11 includes the CPU (Central Processing Unit) 11a, the RAM (Random Access Memory) 11b, the ROM (Read Only Memory) 11c, dedicated hardware circuits, and the like and performs overall operational control of the client apparatus 10. The CPU 11a loads information processing programs stored in the ROM 11c in the RAM 11b and executes the information processing programs. The ROM 11c is a nonvolatile memory that stores programs executed by the CPU 11a, data, and the like. The ROM 11c is an example of a non-transitory computer readable recording medium.

The controller circuit 11 is connected to the image scanner 12, the image processor 14, the image memory 15, the image forming device 16, the operation device 17 including the display device 17a, the storage device 18, the facsimile communication device 19, the network communication interface 13, and the like. The controller circuit 11 performs operational control of the respective devices connected thereto and sends/receives signals and data to/from those devices.

3. HARDWARE CONFIGURATION OF SNS SERVER APPARATUS

Figure 3:
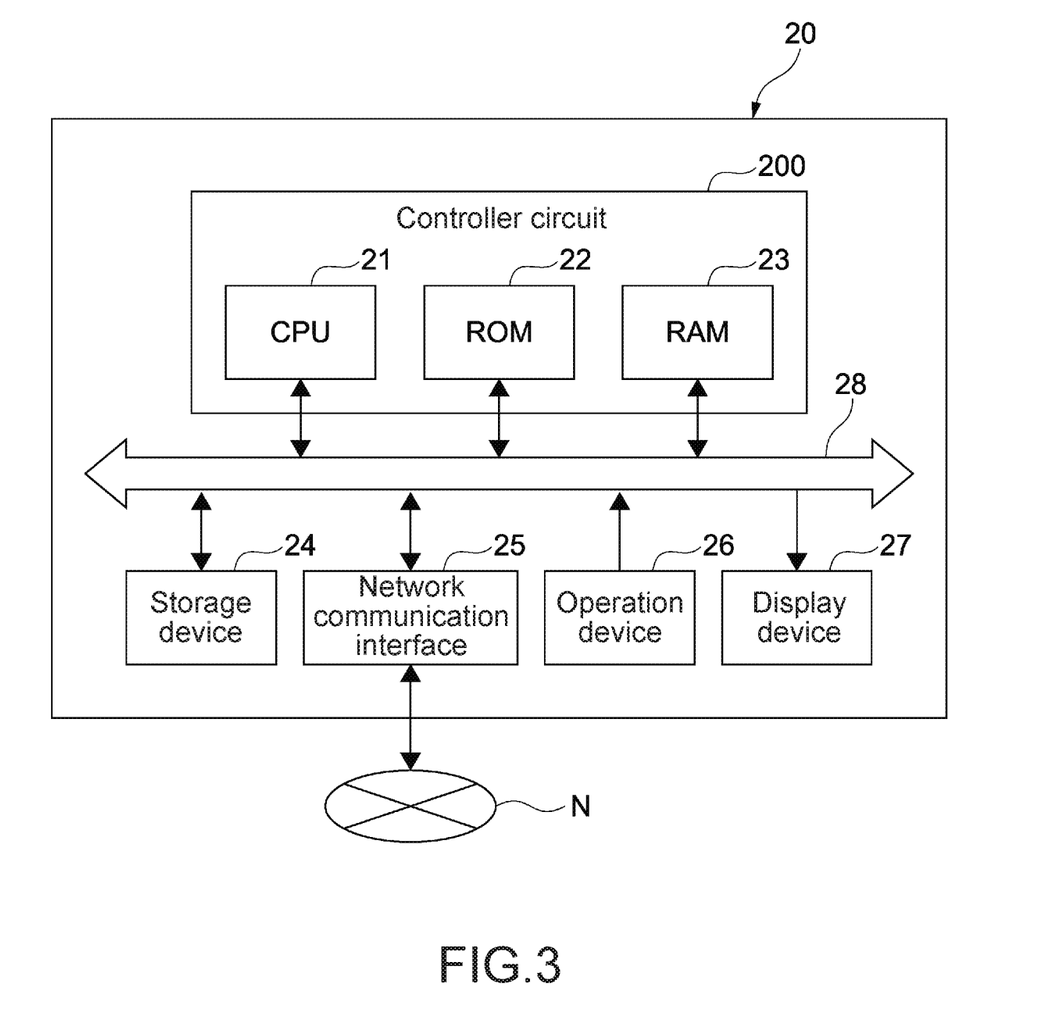
FIG. 3 shows a hardware configuration of an SNS server apparatus.

FIG. 3 shows a hardware configuration of an SNS server apparatus.

The SNS server apparatus 20 includes the CPU 21, the ROM 22, the RAM 23, the storage device 24, the network communication interface 25, the operation device 26, and the display device 27, and the bus 28 connecting them to each other.

The controller circuit 200 includes the CPU 21, the ROM 22, and the RAM 23. The CPU 21 loads information processing programs stored in the ROM 22 in the RAM 23 and executes the information processing programs. The ROM 22 stores programs executed by the CPU 21, data, and the like nonvolatile. The ROM 22 is an example of a non-transitory computer readable recording medium.

4. HARDWARE CONFIGURATION OF TERMINAL APPARATUS

Figure 4:
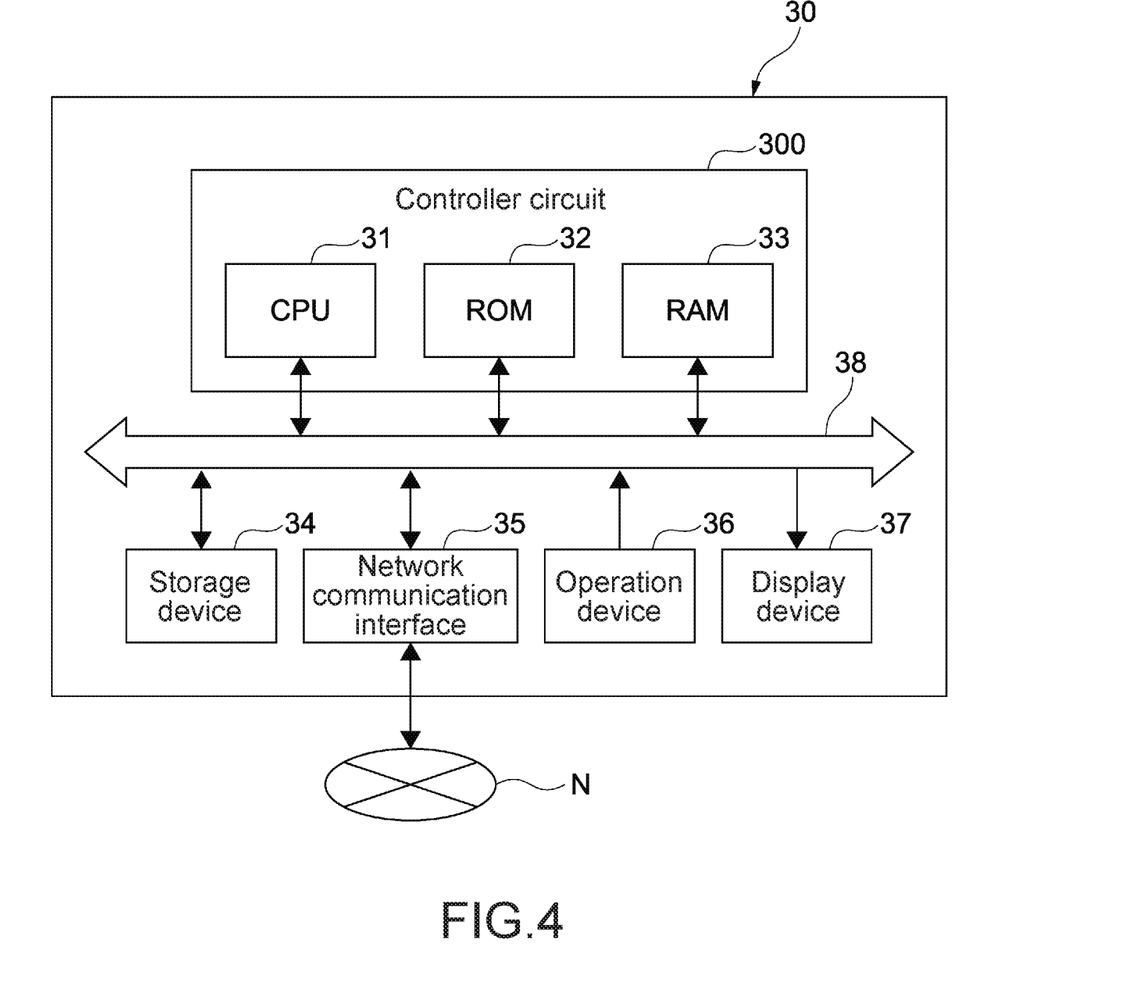
FIG. 4 shows a hardware configuration of a terminal apparatus.

FIG. 4 shows a hardware configuration of a terminal apparatus.

The terminal apparatus 30 includes the CPU 31, the ROM 32, the RAM 33, the storage device 34, the network communication interface 35, the operation device 36, and the display device 37, and the bus 38 connecting them to each other.

The controller circuit 300 includes the CPU 31, the ROM 32, and the RAM 33. The CPU 31 loads information processing programs stored in the ROM 32 in the RAM 33 and executes the information processing programs. The ROM 32 stores programs executed by the CPU 31, data, and the like nonvolatile. The ROM 32 is an example of a non-transitory computer readable recording medium.

5. FUNCTIONAL CONFIGURATION OF INFORMATION PROCESSING SYSTEM

Figure 5:
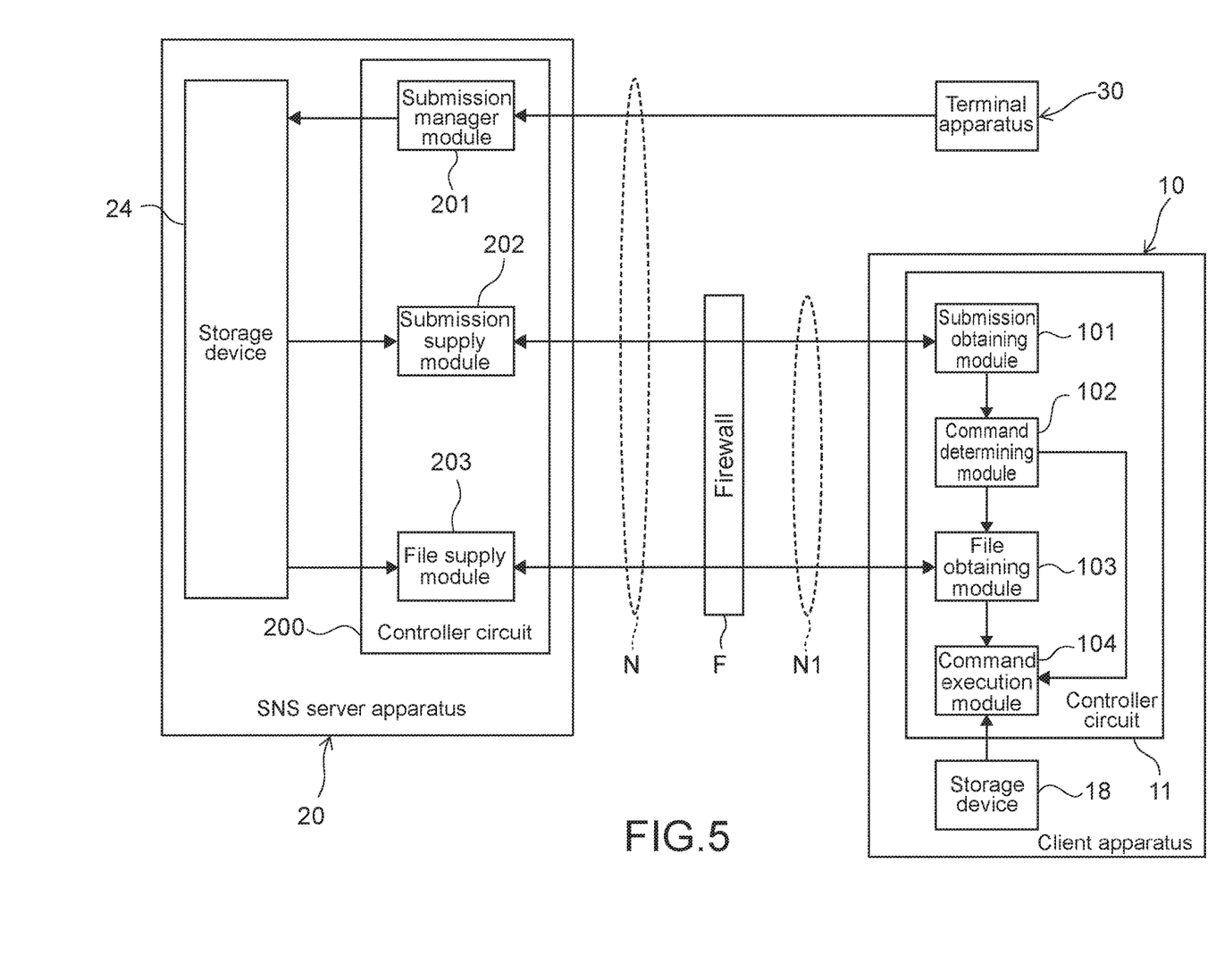
FIG. 5 shows a functional configuration of the information processing system.

FIG. 5 shows a functional configuration of the information processing system.

In the SNS server apparatus 20, in the controller circuit 200, the CPU 21 loads an information processing program stored in the ROM 22 in the RAM 23 and executes the information processing program to operate as the submission manager module 201, the submission supply module 202, and the file supply module 203.

In the client apparatus 10, in the controller circuit 100, the CPU 11 loads an information processing program stored in the ROM 12 in the RAM 13 and executes the information processing program to operate as the submission obtaining module 101, the command determining module 102, the file obtaining module 103, and the command execution module 104.

In the SNS server apparatus 20, the submission manager module 201 receives one or more (typically, plurality of) messages and files submitted from the terminal apparatus 30 to the SNS in time series, stores the messages and files in the storage device 24, and sends a push message to the terminal apparatus 30.

In the client apparatus 10, the submission obtaining module 101 sends (polls) a request to send (a) message(s) and/or (a) file(s) submitted to a channel, to which the client apparatus 10 logs in, of the SNS, to the SNS server apparatus 20 via the network N at regular intervals (typically, every several seconds). The submission obtaining module 101 receives (a) message(s) and/or (a) file(s) sent from the SNS server apparatus 20 via the network N.

In the SNS server apparatus 20, the submission supply module 202 sends, to the client apparatus 10, (a) message(s) and/or (a) file(s) submitted to the channel, to which the client apparatus 10 logs in, of the SNS, from time at which the SNS server apparatus 20 received the request last time to time at which the SNS server apparatus 20 receives the request this time.

In the client apparatus 10, the command determining module 102 extracts, from the message(s) and/or the file(s) received from the SNS server apparatus 20, a message including a control command. The command determining module 102 determines whether or not it is necessary to receive a file from the SNS server apparatus 20 in order to execute the control command included in the message.

In the client apparatus 10, the file obtaining module 103 sends a file send request (including file identifier information) to the SNS server apparatus 20 via the network N. The file obtaining module 103 receives the file from the SNS server apparatus 20 via the network N.

In the SNS server apparatus 20, the file supply module 203 reads the file identified by the file identifier information included in the file send request from the storage device 24, and sends the file to the client apparatus 10 via the network N.

In the client apparatus 10, the command execution module 104 executes the processing in accordance with the control command included in the message.

6. OPERATIONAL FLOW OF INFORMATION PROCESSING SYSTEM

Figure 6:
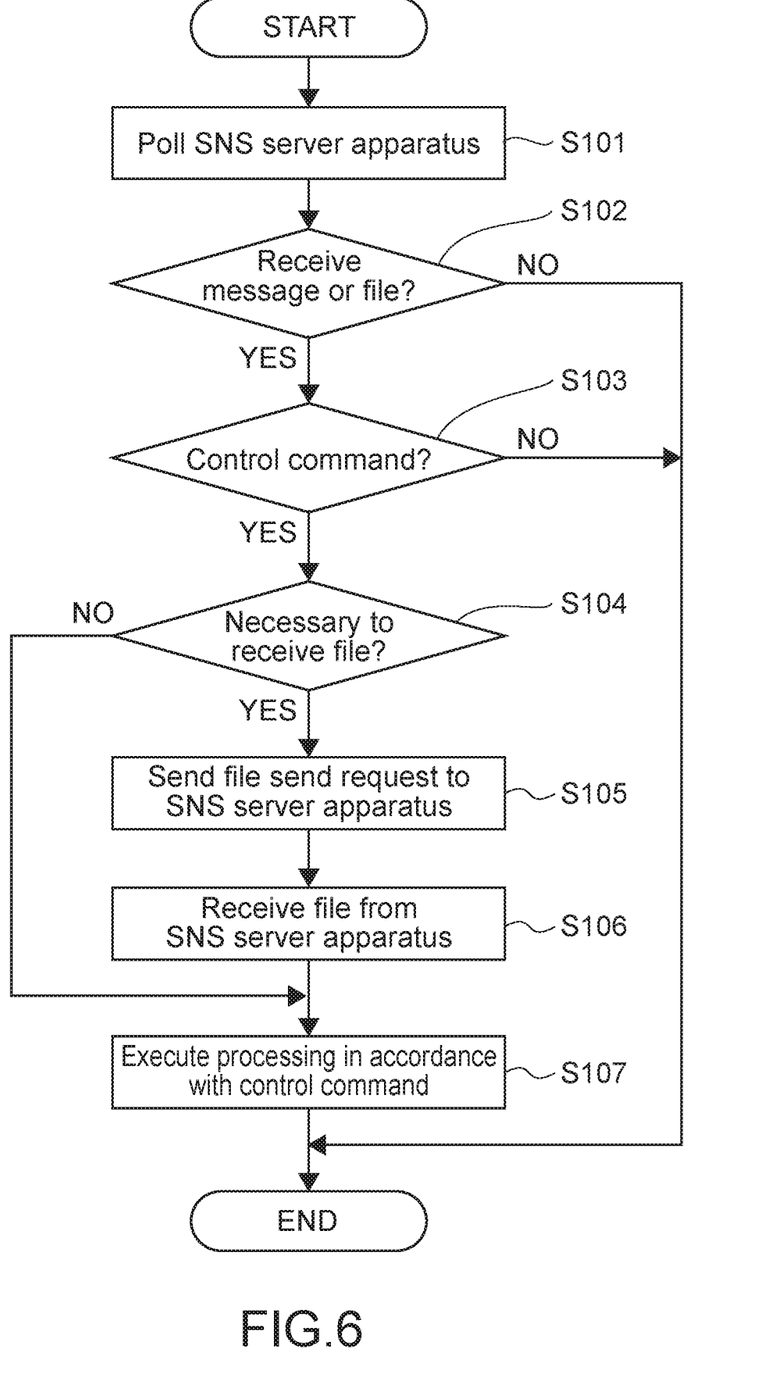
FIG. 6 shows an operational flow of the client apparatus.
Figure 7:
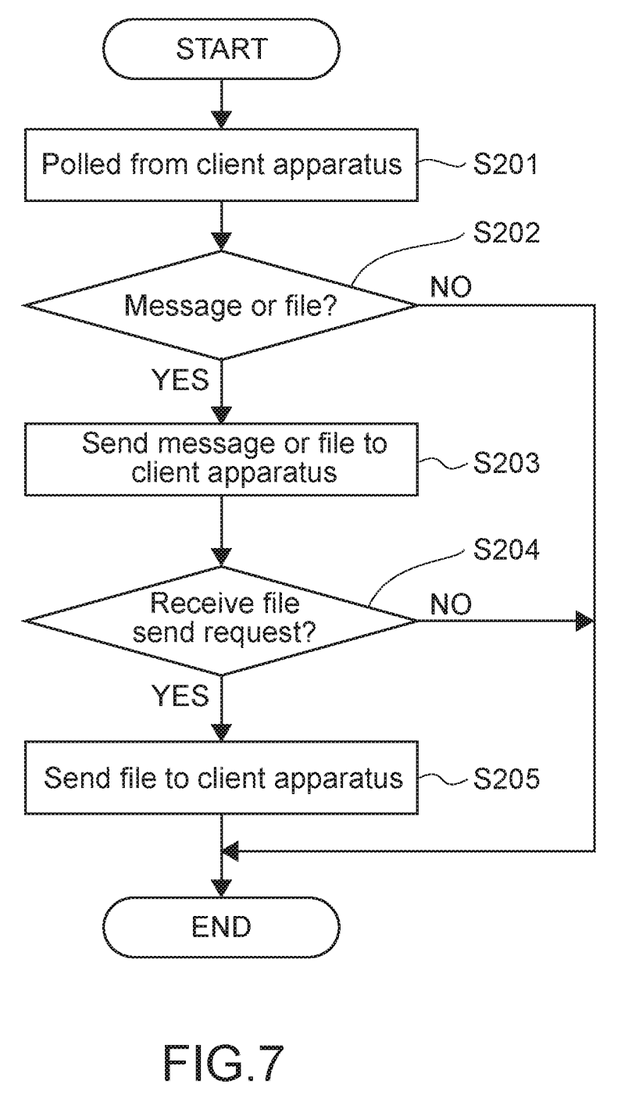
FIG. 7 shows an operational flow of the SNS server apparatus.

Before starting the operational flow, in the SNS server apparatus 20, the submission manager module 201 receives one or more (typically, plurality of) messages and files submitted from the terminal apparatus 30 to the SNS in time series, stores the messages and files in the storage device 24, and sends a push message to the terminal apparatus 30. Also, before starting the operational flow, the client apparatus 10 has logged in to a certain channel of the SNS provided by the SNS server apparatus 20.

FIG. 6 shows an operational flow of the client apparatus.

In the client apparatus 10, the submission obtaining module 101 sends (polls) a request to send (a) message(s) and/or (a) file(s) submitted to a channel, to which the client apparatus 10 logs in, of the SNS, to the SNS server apparatus 20 via the network N at regular intervals (typically, every several seconds) (Step S101).

FIG. 7 shows an operational flow of the SNS server apparatus.

In the SNS server apparatus 20, the submission supply module 202 receives the request from the client apparatus 10 via the network N (Step S201). Then the submission supply module 202 determines whether or not there is/are (a) message(s) and/or (a) file(s) submitted to the channel, to which the client apparatus 10 logs in, of the SNS, from time at which the SNS server apparatus 20 received the request last time to time at which the SNS server apparatus 20 receives the request this time (Step S202).

The submission supply module 202 determines that there is/are (a) message(s) and/or (a) file(s) submitted to the channel, to which the client apparatus 10 logs in, of the SNS, from time at which the SNS server apparatus 20 received the request last time to time at which the SNS server apparatus 20 receives the request this time (Step S202, YES). Then the submission supply module 202 sends the message(s) and/or the file(s) to the client apparatus 10 via the network N (Step S203). In other words, the submission supply module 202 sends (a) message(s) and/or (a) file(s) submitted to the channel, to which the client apparatus 10 logs in, of the SNS, to the client apparatus 10 via the network N every polling interval polled from the client apparatus 10.

Meanwhile, the submission supply module 202 determines that no message and/or no file is submitted to the channel, to which the client apparatus 10 logs in, of the SNS, from time at which the SNS server apparatus 20 received the request last time to time at which the SNS server apparatus 20 receives the request this time. In this case, the submission supply module 202 finishes the processing (Step S202, NO). Note that, in this case, the client apparatus 10 also finishes the processing (Step 102, NO).

In the client apparatus 10, the submission obtaining module 101 receives, via the network N, the message(s) and/or the file(s) sent from the SNS server apparatus 20 (Step S102, YES).

In the client apparatus 10, the command determining module 102 determines whether or not there is a message including a control command in the message(s) and/or the file(s) received from the SNS server apparatus 20 (Step S103). The "control command" will be described in detail in the following Examples. The command determining module 102 extracts a message including a control command (Step S103, YES). Meanwhile, if there is no message including a control command, the command determining module 102 finishes the processing (Step S103, NO).

The command determining module 102 determines whether or not it is necessary to receive a file from the SNS server apparatus 20 in order to execute the control command included in the message (Step S104). For example, where the control command is a command to send a file stored in the SNS server apparatus 20 via facsimile (in this case, control command includes file identifier information) and if the client apparatus 10 does not store the file, it is necessary for the client apparatus 10 to receive the file from the SNS server apparatus 20 (this case will be described in detail in the following Examples). An example of the case where "the client apparatus 10 does not store the file" is a case where the client apparatus 10 received the file from the SNS server apparatus 20 by polling before (Step S102, YES) but does not store the file anymore because a long time has passed after the client apparatus 10 received the file.

The command determining module 102 determines that it is necessary to receive the file from the SNS server apparatus 20 (Step S104, YES). In this case, the file obtaining module 103 sends a file send request to the SNS server apparatus 20 via the network N. (Step S105). The file send request includes file identifier information (i.e., file identifier information included in control command).

In the SNS server apparatus 20, the file supply module 203 receives the file send request from the client apparatus 10 via the network N (Step S204, YES). The file supply module 203 reads the file identified by the file identifier information included in the file send request from the storage device 24, and sends the file to the client apparatus 10 via the network N (Step S205).

In the client apparatus 10, the file obtaining module 103 receives the file from the SNS server apparatus 20 via the network N (Step S106).

In the client apparatus 10, the command execution module 104 executes processing in accordance with the control command (Step S103, YES) included in the message (Step S107). In this example, the command execution module 104 sends the file received from the SNS server apparatus 20 (Step S106) via facsimile in response to the control command.

Note that the command determining module 102 determines that it is not necessary to receive the file from the SNS server apparatus 20 in order to execute the control command included in the message (Step S104, NO). An example thereof is a case where the control command is a command to send a file stored in the storage device 18 from the client apparatus 10. In this case, the command execution module 104 executes the processing in accordance with the control command included in the message (Step S107). Note that, in this case, the SNS server apparatus 20 finishes the processing (Step 204, NO).

7. EXAMPLES

Hereinafter, with reference to a plurality of specific examples of a message including a control command, the processing of each control command will be described specifically. In the present embodiment, "a message including a control command" is a message in which "@" is described in the head and one or more parameters are described subsequently. Where a plurality of parameters is described, a space is interposed between two parameters and the parameters are thereby divided individually.

(1) Example 1

In the client apparatus 10, the command determining module 102 extracts a message including a facsimile send command, destination information, and file identifier information as a control command (Step S103, YES). This file is a file stored in the SNS server apparatus 20 or a file stored in the client apparatus 10.

In Example 1, the control command is "@Fax 030-9999-9999 cost-estimate.pdf". In short, the control command includes the facsimile send command "@Fax", the facsimile number "030-9999-9999" of the destination being destination information as a first parameter, and the file identifier information "cost-estimate.pdf" of a file stored in the SNS server apparatus 20 as a second parameter. Note that the first parameter as destination information may be a user identifier that uniquely identifies a facsimile number stored in the client apparatus 10.

In the client apparatus 10, the command determining module 102 determines whether or not it is necessary to receive the file from the SNS server apparatus 20 in order to execute the control command "@Fax 030-9999-9999 cost-estimate.pdf" (Step S104). The command determining module 102 determines that it is necessary to receive the file identified by the identifier information "cost-estimate.pdf" (in other words, the client apparatus 10 does not store this file) (Step S104, YES). In this case, the file obtaining module 103 sends a file send request (including identifier information "cost-estimate.pdf") to the SNS server apparatus 20 via the network N (Step S105).

In the SNS server apparatus 20, the file supply module 203 receives the file send request (including identifier information "cost-estimate.pdf") from the client apparatus 10 via the network N (Step S204, YES). The file supply module 203 reads the file identified by the identifier information "cost-estimate.pdf" included in the file send request from the storage device 24, and sends the file to the client apparatus 10 via the network N (Step S205).

In the client apparatus 10, the file obtaining module 103 receives the file identified by the identifier information "cost-estimate.pdf" from the SNS server apparatus 20 via the network N (Step S106).

In the client apparatus 10, the command execution module 104 executes the processing in accordance with the control command "@Fax 030-9999-9999 cost-estimate.pdf" (Step S107). Specifically, the command execution module 104 sends the file identified by the identifier information "cost-estimate.pdf" to "030-9999-9999" via facsimile.

Meanwhile, the command determining module 102 determines that it is not necessary to receive the file identified by the identifier information "cost-estimate.pdf" (in other words, the client apparatus 10 stores this file) (Step S104, NO). In this case, the command execution module 104 reads the file identified by the identifier information "cost-estimate.pdf" from the storage device 18, and sends the file to "030-9999-9999" via facsimile (Step S107).

(2) Example 2

In the client apparatus 10, the command determining module 102 extracts a message including an email send command, destination information, and file identifier information as a control command (Step S103, YES). This file is a file stored in the SNS server apparatus 20 or a file stored in the client apparatus 10. Note that, typically, a file stored in the client apparatus 10 is to be sent via email. However, if the terminal apparatus 30 does not store a destination email address, in some cases, a file stored in the SNS server apparatus 20 is to be sent via email.

In Example 2, the control command is "@Send abc@xyz.com cost-estimate.pdf". In short, the control command includes the email send command "@Send", the email address "abc@xyz.com" of the destination being destination information as a first parameter, and the file identifier information "cost-estimate.pdf" of a file stored in the SNS server apparatus 20 as a second parameter. Note that the first parameter as destination information may be a user identifier that uniquely identifies an email address stored in the client apparatus 10.

In the client apparatus 10, the command determining module 102 determines whether or not it is necessary to receive the file from the SNS server apparatus 20 in order to execute the control command "@Send abc@xyz.com cost-estimate.pdf" (Step S104). The command determining module 102 determines that it is necessary to receive the file identified by the identifier information "cost-estimate.pdf" (in other words, the client apparatus 10 does not store this file) (Step S104, YES). In this case, the file obtaining module 103 sends a file send request (including identifier information "cost-estimate.pdf") to the SNS server apparatus 20 via the network N (Step S105).

In the SNS server apparatus 20, the file supply module 203 receives the file send request (including identifier information "cost-estimate.pdf") from the client apparatus 10 via the network N (Step S204, YES). The file supply module 203 reads the file identified by the identifier information "cost-estimate.pdf" included in the file send request from the storage device 24, and sends the file to the client apparatus 10 via the network N (Step S205).

In the client apparatus 10, the file obtaining module 103 receives the file identified by the identifier information "cost-estimate.pdf" from the SNS server apparatus 20 via the network N (Step S106).

In the client apparatus 10, the command execution module 104 executes the processing in accordance with the control command "@Send abc@xyz.com cost-estimate.pdf" (Step S107). Specifically, the command execution module 104 sends the file identified by the identifier information "cost-estimate.pdf" to "abc@xyz.com" via email.

Meanwhile, the command determining module 102 determines that it is not necessary to receive the file identified by the identifier information "cost-estimate.pdf" (in other words, the client apparatus 10 stores this file) (Step S104, NO). In this case, the command execution module 104 reads the file identified by the identifier information "cost-estimate.pdf" from the storage device 18, and sends the file to "abc@xyz.com" via email (Step S107).

(3) Example 3

In the control command of Example 3, a destination name is added to the control command of Example 1 or Example 2. For example, in Example 3, the control command is "@Fax 030-9999-9999 cost-estimate.pdf ABC-Firm" or "@Send abc@xyz.com cost-estimate.pdf ABC-Firm". In short, the control command includes the information of the control command of Example 1 or Example 2, and further includes the destination name "ABC-Firm" as a third parameter.

In Example 3, in the client apparatus 10, the command execution module 104 creates a letter file, in which the destination name "ABC-Firm" is described in a template file stored in the client apparatus 10, and further sends the letter file via facsimile (or email), in accordance with the control command (Step S107).

(4) Example 4

In the client apparatus 10, the command determining module 102 extracts a destination list obtain command as a control command (Step S103, YES).

In Example 4, the control command is "@UserList". In short, the control command includes the destination list obtain command "@UserList" and includes no parameter.

In the client apparatus 10, the command determining module 102 determines that it is not necessary to receive the file from the SNS server apparatus 20 in order to execute the control command "@UserList" (Step S104, NO).

In the client apparatus 10, the command execution module 104 executes the processing in accordance with the control command "@UserList" (Step S107). Specifically, the command execution module 104 submits, to the channel of the SNS, a message including a list of destination information (number, email address, facsimile number, and/or user identifier uniquely identifying email address, etc.), which is accessible from the client apparatus 10 (accessible by sending facsimile and/or email) a file.

(5) Example 5

In the client apparatus 10, the command determining module 102 extracts a send history obtain command as a control command (Step S103, YES).

In Example 5, the control command is "@History". In short, the control command includes the send history obtain command "@History" and includes no parameter.

In the client apparatus 10, the command determining module 102 determines that it is not necessary to receive the file from the SNS server apparatus 20 in order to execute the control command "@History" (Step S104, NO).

In the client apparatus 10, the command execution module 104 executes the processing in accordance with the control command "@History" (Step S107). Specifically, the command execution module 104 submits, to the channel of the SNS, a message including information (list of send date-and-time, destination, etc.) previously sent (sent via facsimile and/or sent email) from the client apparatus 10.

8. CONCLUSION

Typically, a client apparatus (for example, MFP) used in an office is connected to the intranet in the office. So, if a terminal apparatus is not capable of being connected to the intranet because a user who has the terminal apparatus is out of the office (on the road), the terminal apparatus cannot directly access the client apparatus via the Internet. There are some methods of accessing from a terminal apparatus to a client apparatus connected to an in-office intranet via the Internet. For example, the following two methods (1) and (2) are known principally.

(1) A terminal apparatus is connected to a client apparatus via a VPN. However, according to this method, the terminal apparatus has to previously obtain an account or an access right for the VPN. So, even if a VPN environment is provided, the terminal apparatus is capable of being connected to the client apparatus only after the terminal apparatus obtains an account or an access right. Further, VPNs are provided in not all offices. So, if a VPN environment is not provided, a terminal apparatus is not capable of being connected to a client apparatus.

(2) An application for controlling a server that has a global IP address (here, including STUN server or TURN server) and an MFP (client apparatus) is constructed. However, it takes much costs to construct a server that has a global IP address (including virtual computer in cloud).

To the contrary, according to the present embodiment, the client apparatus 10 is configured to receive, from the SNS server apparatus 20, one or more messages submitted from the terminal apparatus 30 to a channel, to which the client apparatus 10 logs in, of the SNS, extract, from the one or more messages, a message including a control command to the client apparatus 10, and execute processing in accordance with the control command.

According to the present embodiment, the terminal apparatus 30 is not capable of accessing the client apparatus 10, which is connected to a network via a firewall, and therefore is not capable of directly sending a control command to the client apparatus 10. However, the SNS server apparatus 20 sends a control command from the terminal apparatus 30 to the client apparatus 10. As a result, the client apparatus 10 is capable of obtaining a control command from the terminal apparatus 30 without newly constructing a server having a global IP address.

According to the present embodiment, the client apparatus 10 is configured to send (poll), to the SNS server apparatus 20 at regular intervals, a request to send one or more messages submitted to the channel, to which the client apparatus 10 logs in, of the SNS, the SNS server apparatus 20 is configured to, where the SNS server apparatus 20 receives the request, send, to the client apparatus 10, one or more messages submitted to the channel, to which the client apparatus 10 logs in, of the SNS, from time at which the SNS server apparatus 20 received the request last time to time at which the SNS server apparatus 20 receives the request this time, and the client apparatus 10 is configured to receive the one or more messages sent from the SNS server apparatus 20.

According to the present embodiment, if the SNS server apparatus 20 receives a request (i.e., is polled) from the client apparatus 10 as a trigger, the SNS server apparatus 20 sends a message to the client apparatus 10. In other words, the SNS server apparatus 20 does not send a push message to the client apparatus 10. In other words, it is not necessary to newly configure an information processing program executable by the SNS server apparatus 20. Instead, it is only necessary for a provider that provides the client apparatus 10 to design an information processing program, with which the client apparatus 10 obtains a message from the SNS server apparatus 20, by using a web API of the chat system. Accordingly, since the existing chat system is used as it is without being changed, user-friendliness is increased. In addition, enabling remote work and the like will contribute to work-life balance.

According to the present embodiment, the client apparatus 10 sends (for example, sends via facsimile) a file as the processing in accordance with the control command.

Typically, the terminal apparatus 30 that a user uses does not have a facsimile function. According to the present embodiment, the terminal apparatus 30 sends a control command to send (for example, send via facsimile) a file to the client apparatus 10. The client apparatus 10 sends (for example, sends via facsimile) the file. It is very convenient for a remote worker (user) out of the office to use the facsimile function of the client apparatus 10.

According to the present embodiment, the message further includes a name of the destination as the control command, and the client apparatus 10 is configured to, as the processing in accordance with the control command, create a letter file by describing the name in a template file stored in the client apparatus 10, and further send the letter file.

According to the present embodiment, if the terminal apparatus 30 submits a message further including a destination name, then the client apparatus 10 creates and sends a letter file. So user friendliness is further increased.

According to the present embodiment, the client apparatus 10 is configured to extract, as the control command, a destination list obtain command, and as the processing in accordance with the control command, submit a message including a list of destination information, which is accessible from the client apparatus 10, to the channel of the SNS.

According to the present embodiment, even if the terminal apparatus 30 does not store destination information, the terminal apparatus 30 is capable of obtaining a list of destination information from the client apparatus 10. So user friendliness of sending a file is further increased. Further, it is possible for other terminal apparatuses, which log in to the channel of the SNS, to share the list of destination information. So user friendliness is further increased.

According to the present embodiment, the client apparatus 10 is configured to extract, as the control command, a send history obtain command, and as the processing in accordance with the control command, submit a message including information sent previously from the client apparatus 10 to the channel of the SNS.

According to the present embodiment, the terminal apparatus 30 is capable of obtaining information previously sent from the client apparatus 10 (typically, which is stored only in the client apparatus 10). So user friendliness is further increased. Further, it is possible for other terminal apparatuses, which log in to the channel of the SNS, to share the information previously sent from the client apparatus 10. So user friendliness is further increased.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing system, comprising:
   an SNS server apparatus configured to be connected to a network and store one or more messages submitted to an SNS from a terminal apparatus; and
   a client apparatus configured to be connected to the network via a firewall and capable of communicating with the SNS server apparatus, the client apparatus being configured to
      receive, from the SNS server apparatus, one or more messages submitted to a channel, to which the client apparatus logs in, of the SNS,
      extract, from the one or more messages, a message including a control command to the client apparatus, and
      execute processing in accordance with the control command.

2. The information processing system according to claim 1, wherein
   the client apparatus is configured to send, to the SNS server apparatus at regular intervals, a request to send one or more messages submitted to the channel, to which the client apparatus logs in, of the SNS,
   the SNS server apparatus is configured to, where the SNS server apparatus receives the request, send, to the client apparatus, one or more messages submitted to the channel, to which the client apparatus logs in, of the SNS, from time at which the SNS server apparatus received the request last time to time at which the SNS server apparatus receives the request this time, and
   the client apparatus is configured to receive the one or more messages sent from the SNS server apparatus.

3. The information processing system according to claim 1, wherein
   the client apparatus is configured to
      extract, as the control command, a message including a send command, destination information, and file identifier information, and
      as the processing in accordance with the control command,
         send the file identified by the identifier information stored in the client apparatus to the destination information, or
         receive the file identified by the identifier information stored in the SNS server apparatus from the SNS server apparatus, and send the received file to the destination information.

4. The information processing system according to claim 3, wherein
   the message further includes a name of the destination as the control command, and
   the client apparatus is configured to, as the processing in accordance with the control command, create a letter file by describing the name in a template file stored in the client apparatus, and further send the letter file.

5. The information processing system according to claim 1, wherein
   the client apparatus is configured to
      extract, as the control command, a destination list obtain command, and
      as the processing in accordance with the control command, submit a message including a list of destination information, which is accessible from the client apparatus, to the channel of the SNS.

6. The information processing system according to claim 1, wherein
   the client apparatus is configured to
      extract, as the control command, a send history obtain command, and
      as the processing in accordance with the control command, submit a message including information sent previously from the client apparatus to the channel of the SNS.

7. A client apparatus configured to be connected to a network via a firewall and capable of communicating with an SNS server apparatus, the SNS server apparatus being configured to be connected to the network and store one or more messages submitted to an SNS from a terminal apparatus, the client apparatus comprising:
   a controller circuit configured to
   receive, from the SNS server apparatus, one or more messages submitted to a channel, to which the client apparatus logs in, of the SNS,
   extract, from the one or more messages, a message including a control command to the client apparatus, and
   execute processing in accordance with the control command.

8. A non-transitory computer readable recording medium that records an information processing program that causes a controller circuit of a client apparatus configured to be connected to a network via a firewall and capable of communicating with an SNS server apparatus, the SNS server apparatus being configured to be connected to the network and store one or more messages submitted to an SNS from a terminal apparatus, to  receive, from the SNS server apparatus, one or more messages submitted to a channel, to which the client apparatus logs in, of the SNS,  extract, from the one or more messages, a message including a control command to the client apparatus, and  execute processing in accordance with the control command.

\* \* \* \* \*